(12) United States Patent
Wang et al.

(10) Patent No.: US 8,712,344 B2
(45) Date of Patent: Apr. 29, 2014

(54) TRANSMITTER HAVING A PROGRAMMABLE AMPLIFIER OPERATING CLASS

(75) Inventors: Zhondga Wang, Sunnyvale, CA (US);
Sai Chu Wong, San Jose, CA (US);
Yunteng Huang, Palo Alto, CA (US)

(73) Assignee: Silicon Laboratories Inc., Austin, TX (US)

( * ) Notice: Subject to any disclaimer, the term of this patent is extended or adjusted under 35 U.S.C. 154(b) by 328 days.

(21) Appl. No.: 13/077,405

(22) Filed: Mar. 31, 2011

(65) Prior Publication Data

US 2012/0252383 A1 Oct. 4, 2012

(51) Int. Cl.
*H04B 1/04* (2006.01)
(52) U.S. Cl.
USPC ......... 455/102; 455/127.3; 330/278; 330/296
(58) Field of Classification Search
USPC ........... 455/102, 103, 108, 110, 127.1, 127.2, 455/127.3; 330/261, 273, 278, 288, 295, 330/296
See application file for complete search history.

(56) References Cited

U.S. PATENT DOCUMENTS

| | | | |
|---|---|---|---|
| 6,400,227 B1 * | 6/2002 | Goldfarb et al. | 330/295 |
| 7,170,341 B2 * | 1/2007 | Conrad et al. | 330/51 |
| 7,323,937 B2 * | 1/2008 | Ooya et al. | 330/295 |
| 8,044,716 B1 * | 10/2011 | Loeb et al. | 330/51 |
| 8,130,735 B2 * | 3/2012 | Rofougaran | 370/338 |
| 8,204,457 B2 * | 6/2012 | Choi et al. | 455/115.3 |
| 8,514,015 B2 * | 8/2013 | Chen | 330/51 |
| 2007/0080750 A1 * | 4/2007 | Liebenrood | 330/252 |

* cited by examiner

*Primary Examiner* — Blane J Jackson
(74) *Attorney, Agent, or Firm* — Trop, Pruner & Hu, P.C.

(57) ABSTRACT

A transmitter is adapted to be programmed to select an amplifier operating class for the transmitter out of a plurality of amplifier operating classes. The transmitter is also adapted to operate according to the selected amplifier operating class to communicate a signal to an antenna.

15 Claims, 4 Drawing Sheets

TRANSMITTER HAVING A PROGRAMMABLE AMPLIFIER OPERATING CLASS

BACKGROUND

This disclosure generally relates to a transmitter.

An amplifier is an electronic device for increasing the power of an input signal to produce a corresponding, higher power output signal. The amplifier may be used, for example, to drive an antenna to radiate electromagnetic waves for purposes of wirelessly communicating data.

The manner in which power flows through the amplifier's output transistors determines the class of the amplifier. For example, an output transistor of a class A amplifier conducts for the entire cycle of the amplifier's input signal. For a class B amplifier, an output transistor of the amplifier conducts for one half of the input signal. For a class AB amplifier, an output transistor of the amplifier conducts for less than the full cycle of the input signal but more than one half cycle.

SUMMARY

In an exemplary embodiment, a technique includes selectively programming a transmitter to select an amplifier operating class for the transmitter from a plurality of amplifier operating classes; and communicating a signal to an antenna using the transmitter programmed according to the selected amplifier operating class.

In another exemplary embodiment, an apparatus includes a transmitter, which is adapted to be programmed to select an amplifier operating class for the transmitter from a plurality of amplifier operating classes. The transmitter is further adapted to operate according to the selected amplifier operating class to communicate a signal to an antenna.

In yet another exemplary embodiment, an apparatus includes a transmitter, which is adapted to be programmed to select an amplifier operating class for the transmitter from a plurality of amplifier operating classes and be programmed to select an output power for the transmitter. The transmitter is further adapted to operate according to the selected amplifier operating class and selected output power to communicate a signal to an antenna.

Advantages and other features of the disclosed concepts will become apparent from the following drawing, description and claims.

DETAILED DESCRIPTION

Figure 1:
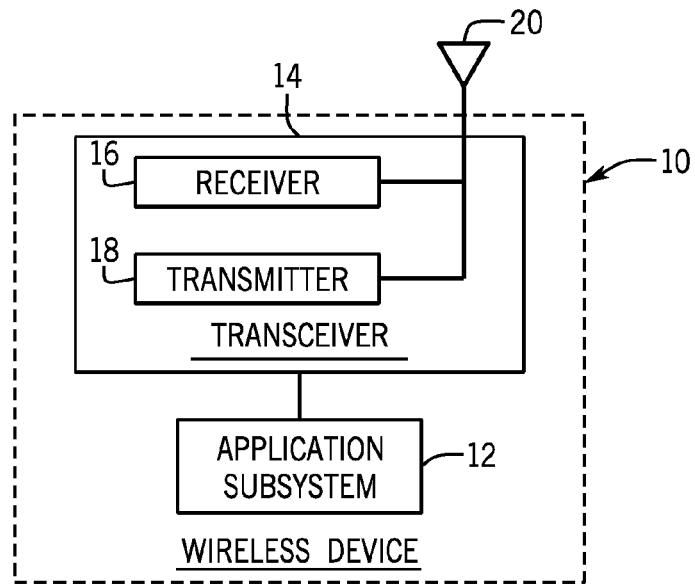
FIG. 1 is a schematic diagram of a wireless device according to an exemplary embodiment.

Referring to FIG. 1, a wireless device 10 may be used in a number of different applications for purposes of communicating data over a wireless link. As non-limiting examples, the wireless device 10 may be a personal computer (PC) peripheral; a wireless toy; a remote keyless entry; an industrial control; a home automation controller, sensor or slave device; a sensor network; etc. In general, the wireless device 10 includes an application subsystem 12, which tailors the wireless device 10 for its specific application and may, for example, form a user interface for the device 10. In general, the application subsystem 12 performs various application processing tasks relating to the application in which the wireless device 10 is employed and these tasks may involve communicating data to a transceiver 14 of the wireless device 10 to be transmitted over a wireless link and receiving data from the transceiver 14, which was received from the wireless link. It is noted that in other exemplary embodiments, the wireless device 10 may only transmit data and not include a receiver. Thus, many variations are contemplated and are within the scope of the appended claims.

The transceiver 14 for the embodiment depicted in FIG. 1 includes a transmitter 18 that is coupled to an antenna 20 for purposes of transmitting data over the wireless link. In this manner, the transmitter 18 modulates a carrier signal with data to be transmitted and provides the resulted modulated carrier signal to the antenna 20, which radiates electromagnetic energy in response to the signal to transmit the data over the wireless link. The transceiver 14 for the embodiment depicted in FIG. 1 also includes a receiver 16, which is coupled to the antenna 20 for purposes of receiving a modulated carrier signal that is indicative of data that is received from the wireless link. The receiver 16 demodulates the modulated carrier signal to recover the transmitted data and provides this data to the application subsystem 12.

In accordance with other exemplary embodiments, the receiver 16 and the transmitter 18 may be coupled to separate antennas of the wireless device 10. Moreover, in accordance with some exemplary embodiments, the wireless device 10 may include multiple antennas 20 that the wireless device 10 selectively couples to the transmitter 18, depending on one of multiple transmission frequency bands that may be selected for the communication over the wireless link. In a similar manner, in accordance with some exemplary embodiments, the wireless device 10 may include multiple antennas 20 that the wireless device 10 selectively couples to the receiver 16, depending on one of multiple transmission frequency bands that may be selected for communication over the wireless link.

Figure 2:
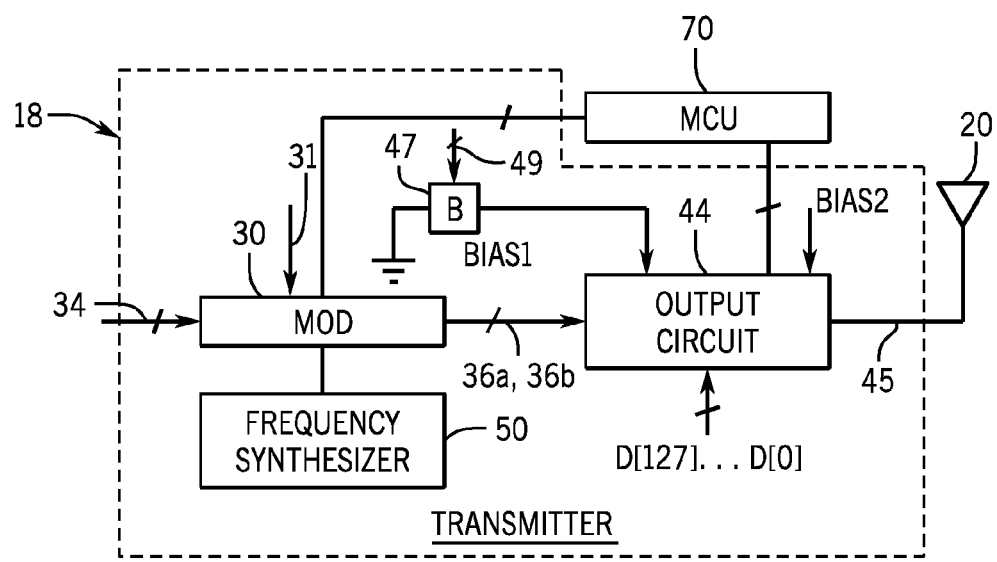
FIG. 2 is a schematic diagram of a transmitter of the wireless device of FIG. 1 according to an exemplary embodiment.

Referring to FIG. 2, the transmitter 18 includes various components which, depending on the particular exemplary embodiment, may be part of the same integrated circuit (may be fabricated on the same die or on separate dies of the same semiconductor package, for example). In accordance with some exemplary embodiments, all of the components of the transmitter 18 are fabricated on the same semiconductor die, and thus, the transmitter 18 is formed from a single integrated circuit. The transmitter 18 includes a modulator 30, which receives data from the application subsystem 12 via input terminals 34.

In general, the modulator 30 modulates the data provided by the application subsystem 12 with a carrier signal (provided by a frequency synthesizer 50, for example) for purposes of generating a modulated signal, or radio frequency (RF) driving signal, which is provided to an output circuit 44 of the transmitter 18. In accordance with some exemplary embodiments, the modulator 30 is constructed to perform one of two different RF driving signals to the output circuit 44: a modulated sinusoidal signal that the modulator 30 provides to an output line 36a and generates by modulating a sinusoidal carrier signal based on the received data using angle modulation (phase modulation (PM) or frequency modulation (FM), for example); and a modulated square wave signal that the modulator 30 provides to an output line 36b and generates by modulating a square wave carrier signal based on the received data using angle modulation.

The particular RF driving signal that the modulator 30 provides to the output circuit 44 is selectively programmed via a control line 31. In this manner, in accordance with some exemplary embodiments, the control line 31 receives a signal (a digital signal, for example) that selects which of the above-described RF driving signals is to be provided to the output circuit 44. In general, the modulator 30 is programmed to provide the modulated sinusoidal signal to the output circuit 44 when the transmitter 18 is to operate in a non-switch mode amplifier class (class A, class B, class AB or class C, as non-limiting examples); and the modulator 30 is programmed to provide the modulated square wave signal to the output circuit 44 when the transmitter 18 is to operate in a switch mode amplifier class (class E or class F, as non-limiting examples). The output circuit 44 responds to the RF driving signal provided by the modulator 30 by generating a power amplified signal to drive the antenna 20.

In addition to the above-described selection of RF driving signals, other aspects of the transmitter 18 are selectable, or programmable, for purposes of configuring the transmitter 18 to operate in one out of a plurality of different amplifier classes, which include (as non-limiting examples) class A, class AB, class B, class C, class E and class F. For example, as depicted in FIG. 2, in accordance with some exemplary embodiments, the output circuit 44 receives an analog biasing signal (called "BIAS1" in FIG. 2), which is used to regulate the biasing of the output circuit's transistor(s) for purposes of configuring the transmitter's amplifier operating class. The magnitude of the BIAS1 signal may be selected, for example, by a signal (a multiple bit digital signal, for example) that is provided to programming input terminals 49 of a bias circuit 47 that provides the BIAS1 signal.

In addition to being programmable for purposes of selecting an amplifier operating class, the transmitter 18 may also be programmable for purposes of selecting the transmitter's output power. As depicted in FIG. 2, in accordance with some exemplary embodiments, the output circuit 44 receives multiple bits (called "D[127]" . . . "D[0]"), which collectively form a multi-bit, digital configuration signal and whose value selects a desired power level for the transmitter 18.

The above-described configuration/programming signals for the transmitter 18 may be generated by any of a number of different sources and may be collectively generated by more than one source. In the example that is depicted in FIG. 2, a microcontroller unit (MCU) 70 (an MCU of the wireless device 10, for example) may execute one or more configuration instructions to program the amplifier operating class and power output of the transmitter 18. For example, in accordance with some exemplary embodiments, the MCU 70 may directly provide the D[127] to D[0] bits to the output circuit 44 or may program a register with the D[127] to D[0] bits. Also, in accordance with some exemplary embodiments, the MCU 70 may directly or indirectly program the bias circuit 47, and the MCU 70 may further program the modulator 30 to select the appropriate RF signal driving. The signals to program the transmitter's amplifier operating class, output power level, etc. may be provided by hardware other than a microcontroller, in accordance with other exemplary embodiments.

Due to the ability to program the transmitter's amplifier operating class and output power, the transmitter 18 may be employed in a large number of different applications by merely selecting the appropriate signals to program the transmitter 18, instead requiring a different circuit design for the transmitter 18 for each of these applications. Thus, in accordance with some exemplary embodiments, the same integrated circuit (containing the transmitter 18) may be used in a wide range of applications that span different amplifier operating classes and output powers, thereby allowing one integrated circuit to address different RF transmitter applications that have different trade offs among transmitter efficiency, spurious emission on harmonics, transmitter linearity, transmitter power control stepping and external matching networks.

Figure 3:
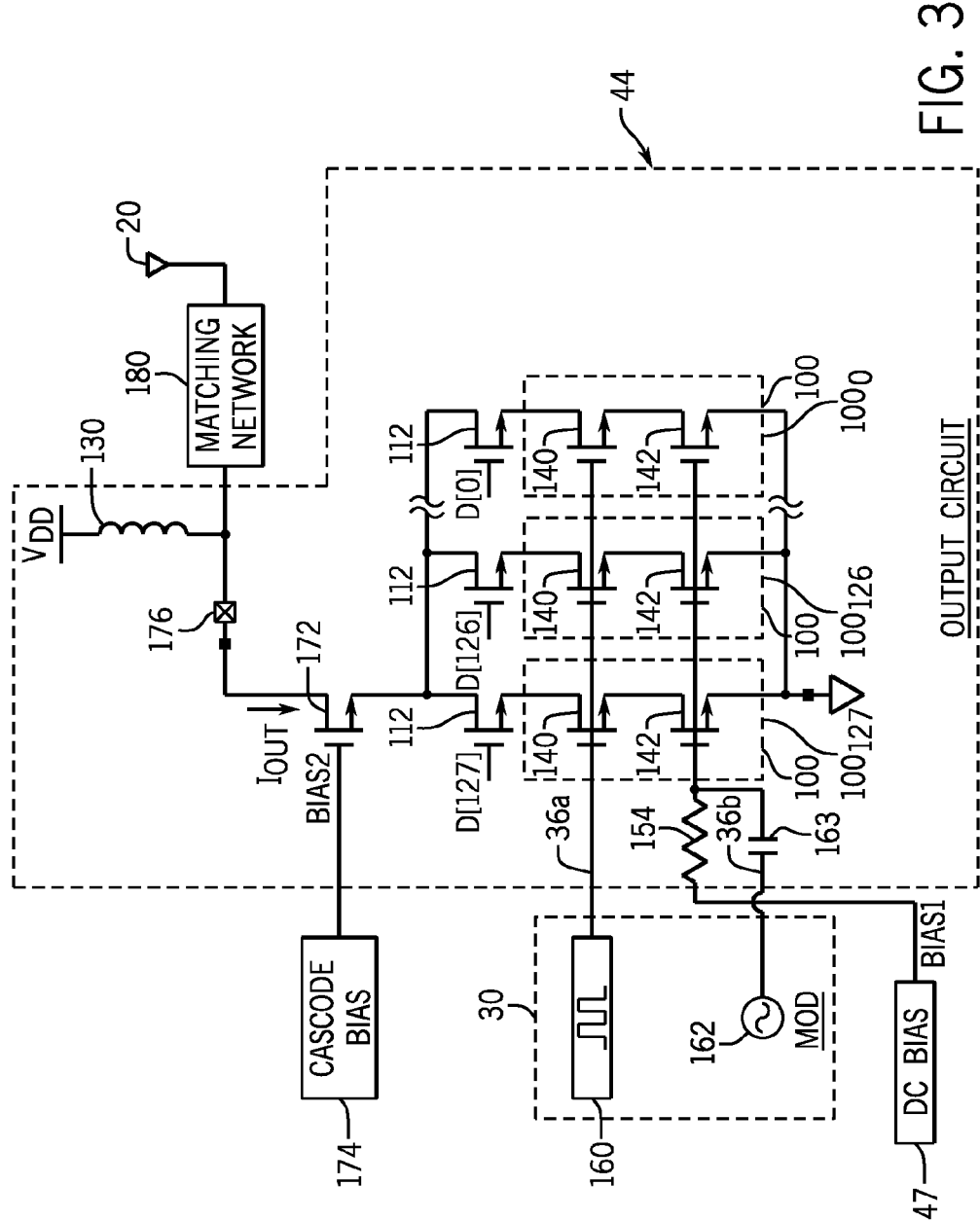
FIG. 3 is a schematic diagram of an output circuit of the transmitter of FIG. 2 according to an exemplary embodiment.

Referring to FIG. 3 in conjunction with FIG. 2, in accordance with some exemplary embodiments, the output circuit 44 includes output stages 100 (output stages $100_0$, $100_{126}$ and $100_{127}$, being depicted in FIG. 3 as examples), which are each associated with different output power for the transmitter 18. As a non-limiting example, the aspect ratios of the transistors for each output stage 100 may be sized differently such that a given output stage 100 may be selected (via the D[127] to D[0] bits) to select the transmitter's power output. As a non-limiting example, in accordance with some exemplary embodiments, the output circuit 44 includes one hundred twenty-eight output stages 100, and each of the output stages 100 is associated with a different one of the D[127] to D[0] bits such that a given output stage 100 (and output power) may be selected by asserting the associated bit and de-asserting the remaining bits.

The D[127] to D[0] bits control whether associated transistors 112 (n-channel metal-oxide-semiconductor field-effect-transistors (nMOSFETs), for example) conduct (or are turned "on") or do not conduct (or are turned "off") for purposes of controlling the coupling of the output stages 100 to an output terminal 176 of the output circuit 44. In this manner, a given transistor 112 may be turned on by the assertion of the associated D[127] to D[0] bit, which causes the transistor 112 to couple an associated output stage 100 to the output terminal 176. As a non-limiting example, bit D[0] may be asserted, or driven to a logical one state, to cause the associated transistor 112 to couple the output stage $100_0$ to the output terminal 176.

Each output stage 100 includes transistors 140 and 142 that have serially coupled main current paths between the associated transistor 112 and ground. In accordance with some exemplary embodiments, the transistor 140 is coupled to receive a signal (via the modulator's output terminal 36a) from a modulated square wave source 160 of the modulator 30, and the transistor 142 is coupled to receive a signal (via the modulator's output terminal 36b) from a modulated sinusoidal signal source 162 of the modulator 30.

The signals that are received by the transistors 140 and 142 depend on the selected amplifier operating class for the transmitter 18. In this manner, when the signal that is provided to the terminal 31 (see FIG. 2) of the modulator 30 selects a non-switch mode amplifier class (class A, class AB, class B or class C, as non-limiting examples) that is associated with a modulated sinusoidal signal, the source 162 provides a modulated sinusoidal signal to the output line 36b, and the source 160 provides a DC bias voltage (in lieu of the modulated square wave signal) to the output line 36a. Continuing the example, the transistor 142 receives the modulated sinusoidal signal superimposed on a DC bias established by the BIAS1 voltage. The magnitude of the BIAS1 voltage, in turn, is regulated based on the particular selected amplifier class. When the signal that is provided to the terminal 31 (see FIG. 2) of the modulator 30 selects a switch mode amplifier class (class E or class F, as non-limiting examples) that is associated with a modulated square wave signal, then the source 160 provides a modulated square wave signal to the output line 36a, the source 162 provides no signal, and the DC bias circuit 47 provides the BIAS1 voltages at the appropriate regulated level to the transistor 142.

In accordance with some exemplary embodiments, the transistors 112, 140 and 142 may be nMOSFETS. For a given output stage 100, the source terminal of the nMOSFET 142 is coupled to ground; the gate terminal of the nMOSFET 142 is coupled to the output terminal of the bias circuit 47 via a resistor 154 and to the output terminal of the source 162 via a capacitor 163; the drain terminal of the nMOSFET 142 is coupled to the source terminal of the nMOSFET 140; the gate terminal of the nMOSFET 140 is coupled to the output terminal of the source 160; and the drain terminal of the nMOSFET 140 is coupled to the source terminal of the associated nMOSFET 112. The gate terminal of the associated nMOSFET 112 receives a bit of the D[127:0] signal.

Among the other features of the output circuit 44, in accordance with some exemplary embodiments, the output circuit 44 includes a transistor 172 that is coupled between the output stages 100 and the output terminal 176. In accordance with some exemplary embodiments, the transistor 172 is an nMOSFET, which has its drain terminal coupled to the output terminal 176, its source terminal coupled to the drain terminals of the transistors 112 (assuming that the transistors 112 are nMOSFETs for this example) and its gate terminal coupled to receive a bias voltage (called "BIAS2" in FIG. 3) from a cascode bias circuit 174. In general, the transistor 172 may be a relatively high voltage nMOSFET that functions as a cascode device to protect the transistors 140 and 142 of the output stages, which may be relatively faster but lower voltage capable devices. Thus, the transistor 172 prevents stressing of the transistors 140 and 142 due to relatively high voltages being present at the output terminal 176. In accordance with some exemplary embodiments, the cascode bias circuit 174 is programmable to regulate the magnitude of the BIAS2 voltage based on the selected amplifier operating class for the transmitter 18. In accordance with other exemplary embodiments, the cascode bias circuit 174 regulates the BIAS2 voltage at the same magnitude independently of the selected amplifier operating class for the transmitter 18. Thus, many variations are contemplated and are within the scope of the appended claims. As also depicted in FIG. 3, the output circuit includes an inductor 130 that is coupled between the output terminal 176 and a positive supply voltage (called "$V_{DD}$" in FIG. 3).

As non-limiting examples, the programming signals that are disclosed herein may be used to select the amplifier operating class for the transmitter 18 as follows. For these examples, the output circuit 44 generates a current signal (called "$I_{OUT}$") in the drain-source path of the transistor 172, and the $I_{OUT}$ output current signal produces a corresponding signal that drives the antenna 20. The $I_{OUT}$ signal has a DC bias current (called "$I_{BIAS}$" in FIGS. 4, 5 and 6, which are discussed below), and the level of the $I_{BIAS}$ current, in turn, controls the amplifier class when a modulated sinusoidal signal is provided to the gate terminal of the nMOSFET 142.

Figure 4:
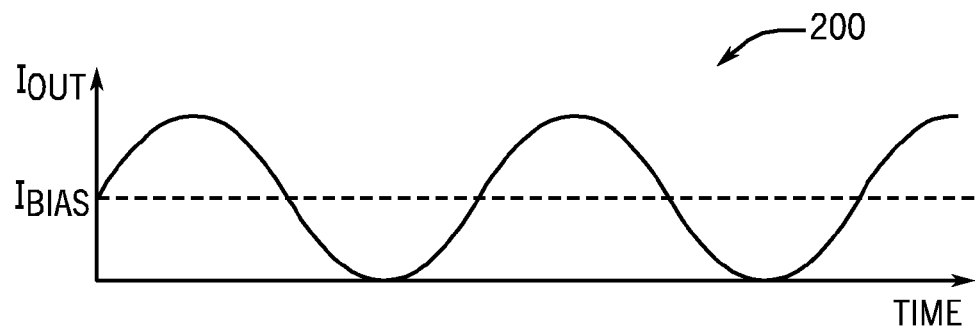
FIGS. 4, 5 and 6 are waveforms of a current of the output circuit of FIG. 3 for different amplifier operating classes according to exemplary embodiments.

For the following examples, it is assumed that the output circuit 44 is driven with a modulated sinusoidal input signal. For this configuration, FIG. 4 depicts a waveform for the $I_{OUT}$ signal, when the transmitter 18 is configured to operate in a class A mode of operation. As shown in FIG. 4 for an exemplary waveform 200 of the $I_{OUT}$ signal, the $I_{OUT}$ signal is continuous due to the BIAS signal causing the $I_{BIAS}$ current to be sufficiently large enough to prevent clipping of the $I_{OUT}$ signal. Thus, the transistor 172 conducts for the entire cycle of the input signal to the output circuit 44.

Figure 5:
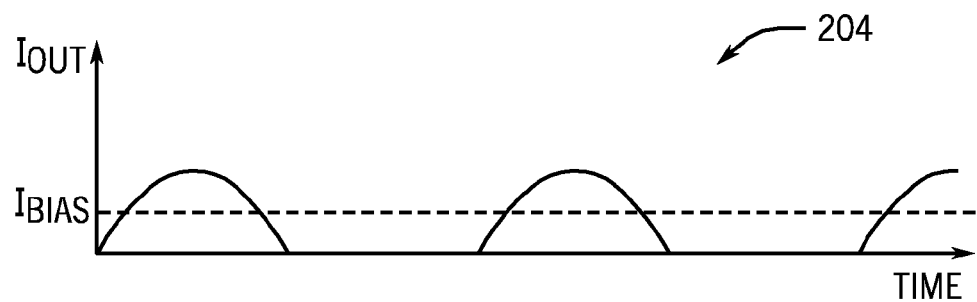

As another example, FIG. 5 depicts a waveform 204 for the $I_{OUT}$ signal when the transmitter 18 operates as a class B amplifier. As shown, for this mode of operation, the $I_{BIAS}$ current is not sufficiently large enough to prevent clipping of the $I_{OUT}$ signal. Thus, in the class B mode of operation, the transistor 172 conducts for one half cycle of the input signal and does not conduct for the other half cycle.

Figure 6:
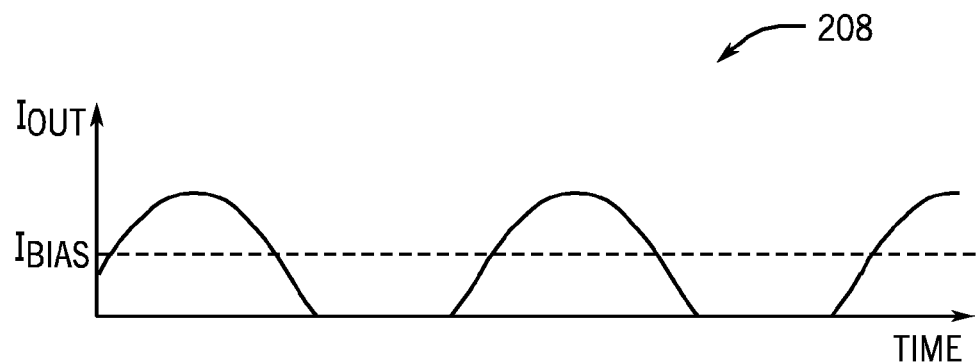

The DC level of the BIAS1 and/or BIAS2 signal may be appropriately adjusted to select other amplification classes. As yet another example, FIG. 6 depicts a waveform 208 for the $I_{OUT}$ signal for the class AB mode of operation in which the $I_{BIAS}$ current is at the appropriate level to cause the transistor 172 to conduct for slightly more than one half cycle of the input signal and not conduct for the remaining portion of the cycle.

Figure 7:
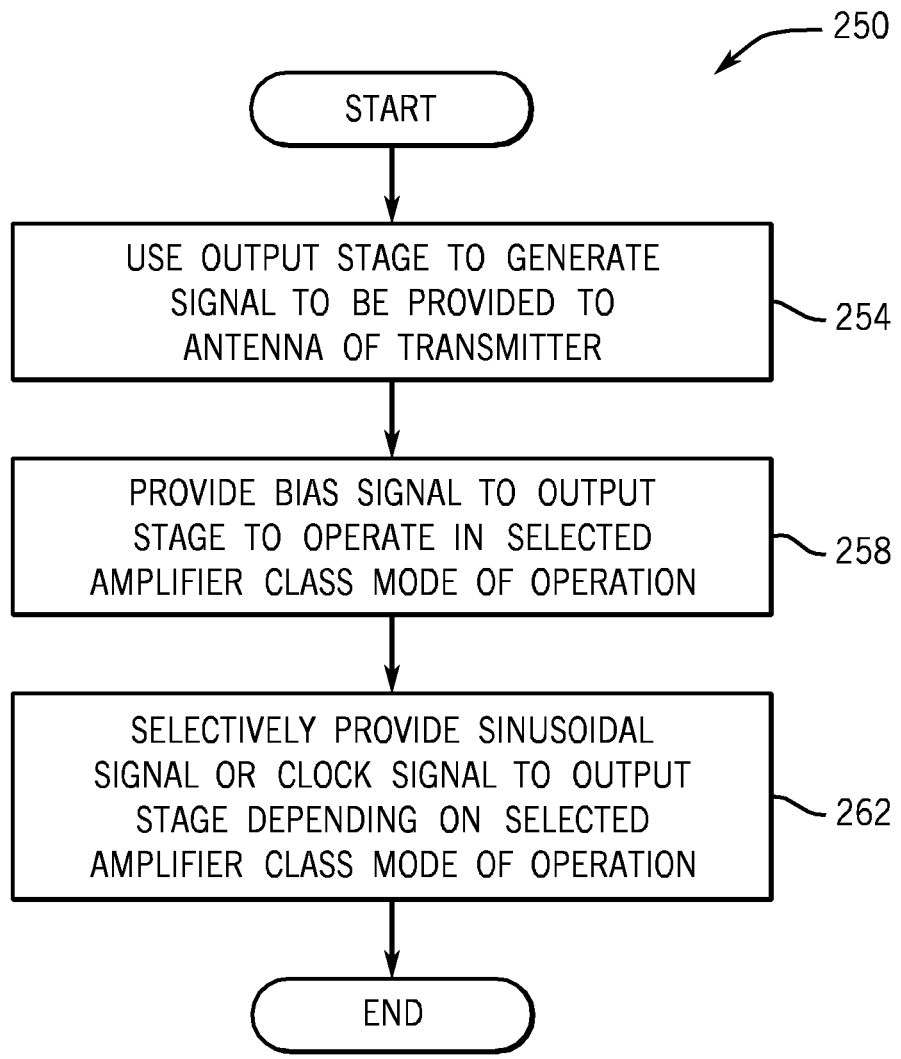
FIG. 7 is a flow diagram depicting a technique to program a transmitter according to an exemplary embodiment.

Referring to FIG. 7, to summarize, in accordance with exemplary embodiments disclosed herein, a technique 250 includes using (block 254) an output stage of a transmitter to generate a signal to be provided to an antenna of the transmitter; selectively programming (block 258) the transmitter to select an amplifier operating class for the transmitter out of a plurality of amplifier operating classes; and selectively programming (block 262) an output power level of the transmitter.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   selectively programming a transmitter to select an amplifier operating class for the transmitter from a plurality of amplifier operating classes, wherein the act of programming comprises selecting a Radio Frequency (RF) driving signal out of a plurality of RF driving signals to be provided to an output circuit of the transmitter;
   communicating a signal to an antenna using the transmitter programmed according to the selected amplifier operating class;
   using an output stage comprising a first transistor and a second transistor coupled to an output terminal of the transmitter to generate the signal to be provided to an antenna; and
   selectively routing the selected RF driving signal to the first and second transistors based on the selected amplifier operating class.

2. The method of claim 1, further comprising wherein the programming comprises selectively programming the transmitter to select a switch mode amplifier operating class or a non-switch mode amplifier operating class.

3. The method of claim 1, further comprising:
   selectively programming the transmitter to select an output power of the transmitter.

4. The method of claim 3, wherein the act of selectively programming the transmitter to select the output power comprises selectively enabling output stages of the transmitter, each of the output stages being associated with a different output power for the transmitter.

5. The method of claim 1, wherein the act of programming comprises regulating a bias signal of the transmitter.

6. An apparatus comprising:
   a transmitter adapted to be programmed to select an amplifier operating class for the transmitter from a plurality of amplifier operating classes and be programmed to select an output power for the transmitter, wherein the transmitter is further adapted to operate according to the selected amplifier operating class to communicate a signal to an antenna, and the transmitter comprises:

a plurality of output stages, each of the output stages being adapted to be selectively enabled to select the output power for the transmitter.

7. The apparatus of claim 6, wherein the transmitter further comprises an output circuit to generate the signal provided to the antenna and a modulator, and the modulator is adapted to be programmed to select an RF driving signal out of a plurality of RF driving signals to be provided to the output circuit.

8. The apparatus of claim 7, wherein the output circuit comprises a first transistor and a second transistor coupled to an output terminal of the transistor to generate the signal to be provided to the antenna, and the modulator is adapted to selectively route the selected RF driving signal to the first and second transistors based on the selected amplifier operating class.

9. The apparatus of claim 6, wherein the transmitter further comprises an output circuit to generate the signal provided to the antenna and a bias circuit adapted to furnish a bias signal to the output circuit and be programmed to regulate the bias signal at a predetermined magnitude based on the selected amplifier operating class.

10. The apparatus of claim 6, wherein the plurality of amplifier operating classes comprise class A, class B, class AB, class C, class E and class F.

11. An apparatus comprising:

a transmitter adapted to be programmed to select an amplifier operating class for the transmitter from a plurality of amplifier operating classes and be programmed to select an output power for the transmitter, wherein the transmitter is further adapted to operate according to the selected amplifier operating class and selected output power to communicate a signal to an antenna, and wherein the transmitter comprises a plurality of output stages, each of the output stages being adapted to be selectively enabled to select the output power for the transmitter.

12. The apparatus of claim 11, wherein the transmitter is further adapted to be programmed to select the output power for the transmitter independently of being programmed to select the amplifier operating class.

13. The apparatus of claim 11, wherein the transmitter further comprises an output circuit to generate the signal provided to the antenna and a modulator, and the modulator is adapted to be programmed to select a Radio Frequency (RF) driving signal out of a plurality of RF driving signals to be provided to the output circuit.

14. The apparatus of claim 11, wherein the output circuit comprises a first transistor and a second transistor coupled to an output terminal of the transistor to generate the signal to be provided to the antenna, and the modulator is adapted to selectively route the selected RF driving signal to the first and second transistors based on the selected amplifier operating class.

15. The apparatus of claim 11, wherein the transmitter further comprises an output circuit to generate the signal provided to the antenna and a bias circuit adapted to furnish a bias signal to the output circuit and be programmed to regulate the bias signal at a predetermined magnitude based on the selected amplifier operating class.

* * * * *